United States Patent
Melzer et al.

(10) Patent No.: US 6,762,882 B2
(45) Date of Patent: Jul. 13, 2004

(54) SYSTEM AND METHOD FOR USE OF DARK FIELD FOURIER DIAPHRAGM IN MULTI-FREQUENCY IMAGING

(75) Inventors: Volker Melzer, Munich (DE); Tobias Damm, Munich (DE); Peter Mueller, Mering (DE); Ralph Thoma, Augsburg (DE)

(73) Assignee: Agfa COrporation, Wilmington, MA (US)

( * ) Notice: Subject to any disclaimer, the term of this patent is extended or adjusted under 35 U.S.C. 154(b) by 0 days.

(21) Appl. No.: 10/294,379

(22) Filed: Nov. 14, 2002

(65) Prior Publication Data
US 2004/0095647 A1 May 20, 2004

(51) Int. Cl.[7] .................. G02B 27/10; G02B 27/46; H04N 5/74; G06K 9/40
(52) U.S. Cl. .................. 359/618; 359/562; 359/563; 359/559; 359/231; 359/232; 359/276; 359/278; 348/771; 382/265; 382/280; 349/17
(58) Field of Search .................. 359/618, 248, 359/238, 231, 232, 276, 278, 320, 559, 562, 566, 563, 245; 382/265, 280; 348/770, 771; 349/17

(56) References Cited

U.S. PATENT DOCUMENTS

| | | | | |
|---|---|---|---|---|
| 4,707,077 A | * | 11/1987 | Marom | 349/17 |
| 5,337,183 A | * | 8/1994 | Rosenblatt | 359/248 |
| 5,668,611 A | * | 9/1997 | Ernstoff et al. | 348/771 |
| 5,742,422 A | * | 4/1998 | Drake | 359/227 |
| 5,883,743 A | * | 3/1999 | Sloan | 359/561 |
| 5,903,323 A | * | 5/1999 | Ernstoff et al. | 348/771 |
| 5,959,776 A | * | 9/1999 | Pasch | 359/562 |
| 6,314,210 B1 | * | 11/2001 | Fukushima et al. | 382/280 |
| 6,424,449 B1 | * | 7/2002 | Namiki | 359/247 |
| 6,552,855 B1 | * | 4/2003 | Kowarz et al. | 359/627 |

* cited by examiner

Primary Examiner—Loha Ben
(74) Attorney, Agent, or Firm—William E. Hilton; Robert A. Sabourin

(57) ABSTRACT

An imaging system is disclosed that includes an illumination source, a modulator and a variable Fourier diaphragm. The illumination source produces a first illumination field having a first frequency and a second illumination field having a second frequency. The modulator receives the first illumination field and the second illumination field, and produces a first modulated illumination field and a second modulated illumination fields. The variable Fourier diaphragm selectively passes one of the first modulated illumination field and the second modulated illumination field.

18 Claims, 5 Drawing Sheets

SYSTEM AND METHOD FOR USE OF DARK FIELD FOURIER DIAPHRAGM IN MULTI-FREQUENCY IMAGING

The invention generally relates to imaging systems, and particularly relates to systems and methods for producing high quality images using light modulators such as diffractive light modulators.

BACKGROUND OF THE INVENTION

Systems for producing high quality images using light modulators typically include an illumination source for producing an illumination field, a light modulator for receiving the illumination field and for producing a modulated illumination field, and imaging optics for directing the modulated illumination field toward an imaging surface. For example, U.S. Pat. No. 6,433,934, the disclosure of which is hereby incorporated by reference, discloses an imaging system that includes an illumination source, a field lens system, a light modulator, imaging optics and an imaging drum for supporting recording media.

The illumination field may include light of a plurality of frequencies and the diffraction of the illumination field by the light modulator will occur at different angles for the different frequencies. The diffraction in discrete angles occurs only for diffractive elements having an infinite number of diffractive units. As the number of interacting diffractive units is increased, the angular distribution of the intensity of the diffracted fields increases and the intensity distribution in the Fourier plane increases.

With reflective light modulators, the first order reflection may be used for imaging. A second order (and to a lesser extent third and fourth order etc.) reflected fields may produce unwanted illumination that is filtered out in the Fourier plane by a slit diaphragm. For example, as shown in FIG. 1, such a conventional imaging system includes an illumination source 10 that produces illumination that is directed by an objective lens 12 (e.g., f=14.5 mm), a plano convex lens 14 (e.g., f=220 mm), and a cylindrical lens 16 (e.g., f=100 mm) toward a mirror 18, which in turn directs the illumination through a corrected objective lens 20 toward a light modulator 22 (e.g., a grating light valve). The illumination is modulated by the light modulator 22 and reflected back through the lens 20 and through a Fourier plane, to an imaging system lens 24, which directs the modulated illumination toward an imaging surface 26 at the imaging plane. A slit diaphragm 28 is positioned in the Fourier plane. The positive and negative first order reflected signals are passed through the slit diaphragm 28, while other order reflected signals (e.g., second, third etc.) are blocked by the slit diaphragm 28.

Conventional Fourier diaphragms, however, cannot be spatially modulated to accommodate modulated signals having different frequencies, for example, time division multiplexed multi-frequency signals such as red, blue, green illumination. This results in a decrease in the resolution in the image plane and a reduction in intensity of the imaging field for systems including multi-frequency illumination sources. This is due, at least in part, to the presence of unwanted illumination (or side lobes) in locations near individual illuminated pixels or small groups of illuminated pixels.

There is a need, therefore, for a multi-frequency imaging system having improved filtering in the Fourier plane.

SUMMARY OF THE INVENTION

The invention provides an imaging system that includes an illumination source, a modulator and a variable Fourier diaphragm. The illumination source produces a first illumination field having a first frequency and a second illumination field having a second frequency. The modulator receives the first illumination field and the second illumination field, and produces a first modulated illumination field and a second modulated illumination fields. The variable Fourier diaphragm selectively passes one of the first modulated illumination field and the second modulated illumination field. In various embodiments, the modulator is a grating light valve and the imaging system may vary the variable Fourier diaphragm responsive to changes in the period of the spacing of ribbons in the grating light valve.

BRIEF DESCRIPTION OF THE DRAWINGS

The following drawings may be further understood with reference to the accompanying drawings in which.

The drawings are shown for illustrative purposes only and are not to scale.

DETAILED DESCRIPTION OF THE ILLUSTRATED EMBODIMENTS

Figure 1:
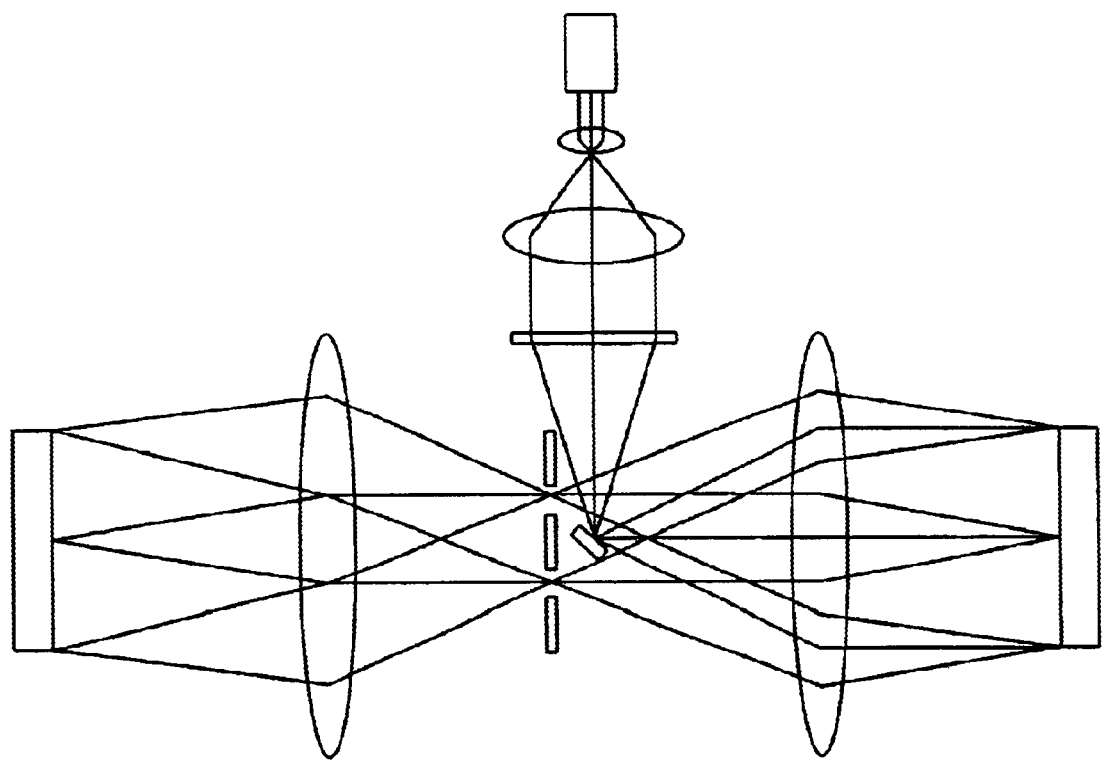
FIG. 1 shows an illustrative diagrammatic view of a prior art imaging system using a light modulator and a slit diaphragm filter in the Fourier plane.
Figure 2:
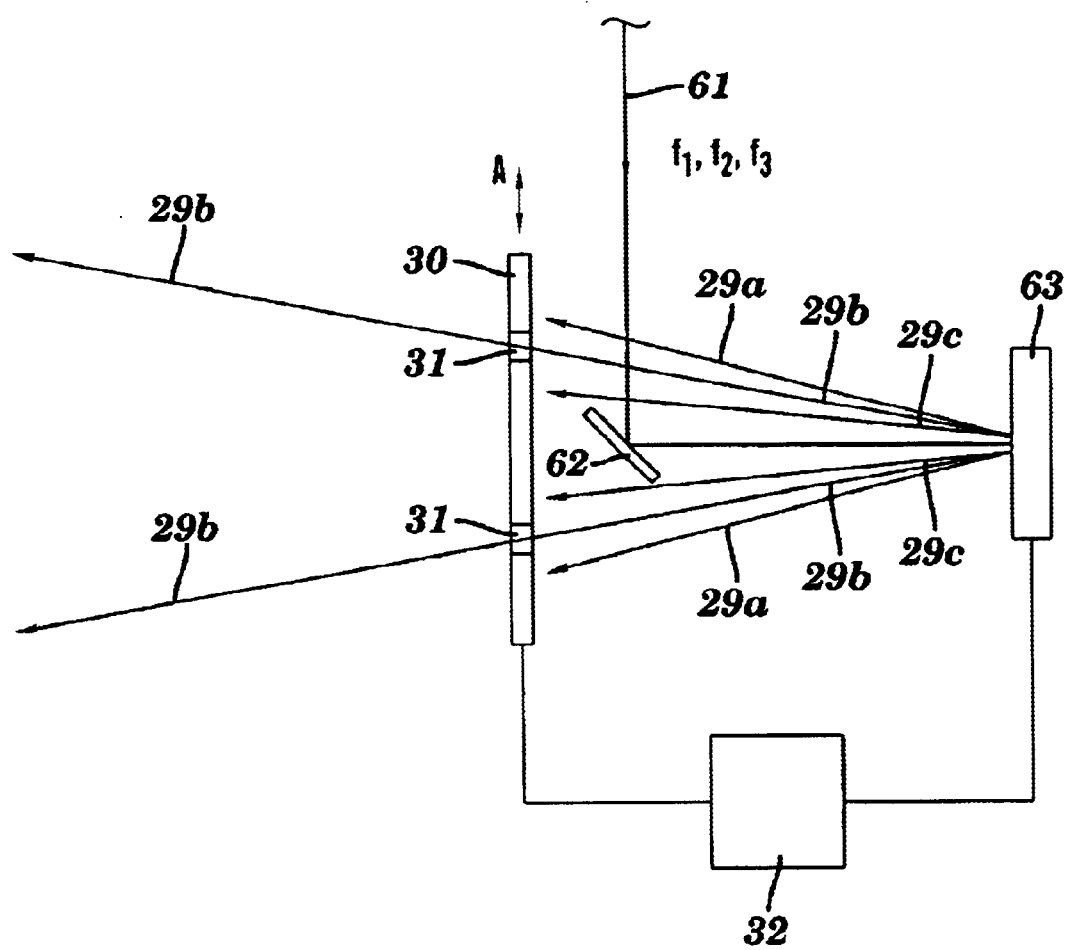
FIG. 2 shows an illustrative diagrammatic view of an image formation correction system in accordance with an embodiment of the invention.

An imaging system in accordance with the invention includes an adjustable Fourier diaphragm. As shown in FIG. 2, a system in accordance with an embodiment of the invention receives an illumination field 61 from an illumination source and directs the illumination field 24 toward a light modulator 63 (e.g., a grating light valve) via one or more mirrors 62. The illumination field 61 may include light having a variety of frequencies (e.g., red, green, blue), and the light that is reflected by the modulator 63 will accordingly be directed in at a variety of angles. For example, light having a first frequency $f_1$ may be reflected by the modulator 63 as shown at 29a, light having a second frequency $f_2$ may be reflected by the modulator 63 as shown at 29b, and light having a third frequency $f_3$ may be reflected by the modulator 63 as shown at 29c.

A laterally modulated Fourier diaphragm 30 may be adjusted to permit signals having one of the above frequencies (e.g., 29b having a frequency $f_2$) to pass through openings 31 in the Fourier diaphragm 30 while blocking other frequency signals 29a and 29c. The Fourier diaphragm preferably provides a lateral structured transmission function (smooth absorption edges of the apodisation function). In further embodiments, the modulator 63 may provide time division multiplexing of the signals having different frequencies by varying the period of spacing of the modulator 63, which may be a grating light valve.

Figure 3A:
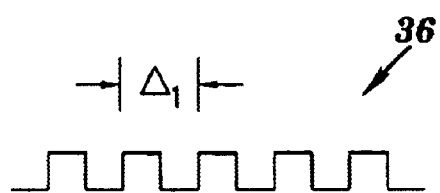
FIGS. 3A and 3B show illustrative diagrammatic views of ribbons of a gradient light valve modulator having a spacing of Al in accordance with an embodiment of the invention.
Figure 3B:
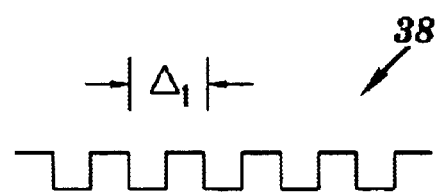
Figure 4A:
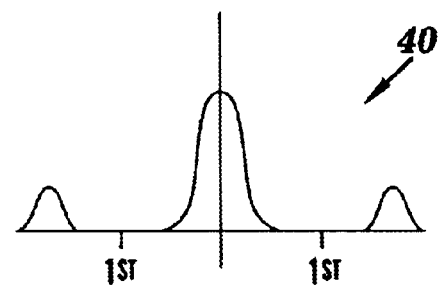
FIGS. 4A and 4B show illustrative graphical views of the ribbons of a gradient light valve modulator having a spacing of $\Delta_1$ in accordance with an embodiment of the invention.
Figure 4B:
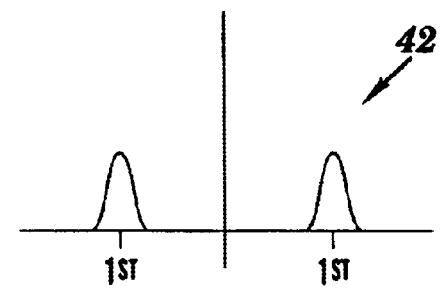

The period of spacing of the ribbons on the light valve 63, with respect to the angle of reflection is provided by:

$$\Delta = k\lambda_i / \sin \alpha_i$$

where $\Delta$ is the period of the spacing of ribbons of the light valve 63, k is the order of reflection, $\lambda_i$ is the wavelength of the illumination signal having a frequency $f_i$, and $\alpha_i$ is the angle of reflection of the illumination signal having a frequency $f_i$. The modulator 63 may provide a grating period of $\Delta_1$ and be switchable as shown at 36 and 38 in FIGS. 3A and 3B respectively. In particular, when the grating appears as shown at 36 in FIG. 3A the response to a signal having a frequency $f_1$ may be as shown at 40 in FIG. 4A including virtually no response in the first order, whereas when the grating appears as shown at 38 in FIG. 3B the response may be as shown at 42 in FIG. 4B including a strong first order response. The intensity of the first order response may be adjusted between the levels shown in FIGS. 4A and 4B by adjusting the grating light valve to a position intermediate the positions as shown in FIGS. 3A and 3B.

Figure 5A:
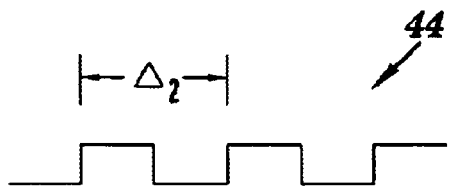
FIGS. 5A and 5B show illustrative diagrammatic views of ribbons of a gradient light valve modulator having a spacing of $\Delta_2$ in accordance with an embodiment of the invention.
Figure 5B:
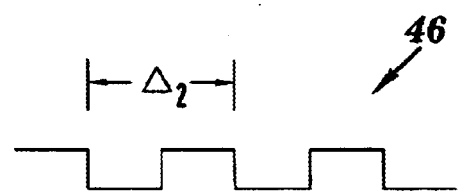
Figure 6A:
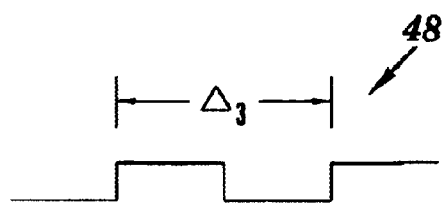
FIGS. 6A and 6B show illustrative diagrammatic views of ribbons of a gradient light valve modulator having a spacing of $\Delta_3$ in accordance with an embodiment of the invention.
Figure 6B:
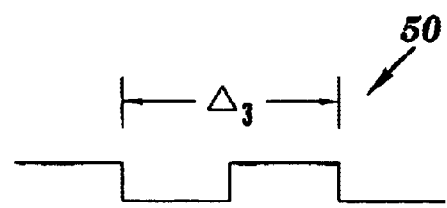

As shown at 44 and 46 in FIGS. 5A and 5B, the grating period may be changed to be $\Delta_2 = 2\Delta_1$ by pairing adjacent ribbons. If the values of $\Delta_i$, $\lambda_i$, and $\alpha_i$ are properly chosen, the first order response angle for the signal $\lambda_2$ using a grating period of $\Delta_2$, will be the same as for $\lambda_1$ using the grating period $\Delta_1$ (of, for example, 3–5 microns). Similarly, the grating period may be changed to be $\Delta_2 = 2\Delta_1$ as shown at 48 in FIGS. 5A and 5B, and with properly chosen values for $\Delta_i, \lambda_i$, and $\alpha_i$ the first order response angle for the signal $\lambda_3$ using a grating period of $\Delta_3$, will be the same as for $\lambda_1$ using the grating period $\Delta_1$.

The grating period of the second modulator therefore, may be changed to re-direct the modulated illumination field to the correct location on the imaging surface in the event that the frequency of the illumination source is slightly offset from the desired frequency. In further embodiments, the second modulator may be used to correct for errors in intensity of portions of the modulated field. In still further embodiments a third or more modulators may be used to correct for different types of errors in the modulated illumination field.

In an embodiment, the current status of the modulator 63 may be communicated to a controller 32, which in turn is coupled to the variable Fourier diaphragm 30, as shown in FIG. 2. The Fourier diaphragm may, therefore, be adjusted in response to changes in the grating period of the modulator to correlate the two devices. The time multiplexed modulation of the position of the transmitting region 31 of the Fourier diaphragm may be used for color mixing or color selection.

Figure 7:
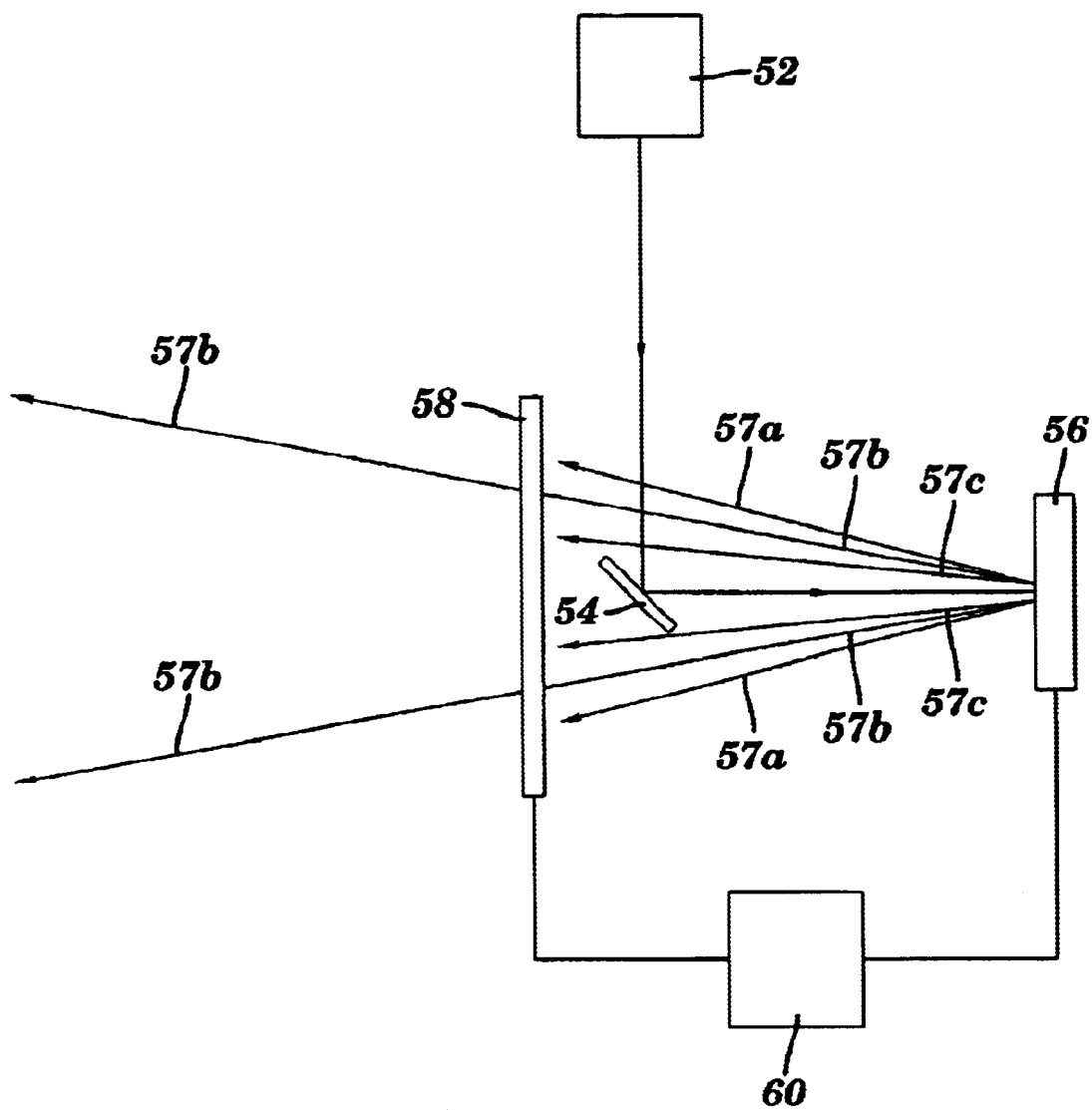
FIG. 7 shows an illustrative diagrammatic view of an image formation correction system in accordance with a further embodiment of the invention.

As shown in FIG. 7, another embodiment of the invention further includes a multi-frequency illumination source 52 that directs illumination toward a modulator 56 via one or more mirrors 54. The illumination 57 reflected from the modulator 56 is directed toward a Fourier diaphragm 58 having adjustable transmission properties. A controller 60 is also coupled to each of the modulator 56 and the Fourier diaphragm 58. The transmission properties of portions of the Fourier diaphragm may be changed responsive to changes in the period of the gratings of the modulator 56. For example, an arrangement in which the grating period of the modulator is arranged to reflect illumination having a frequency of $f_2$ toward the Fourier diaphragm 58, the Fourier diaphragm 58 may be adjusted to block other illumination having a different frequency because the other illumination will not be located in the same position on the Fourier diaphragm.

Figure 8:
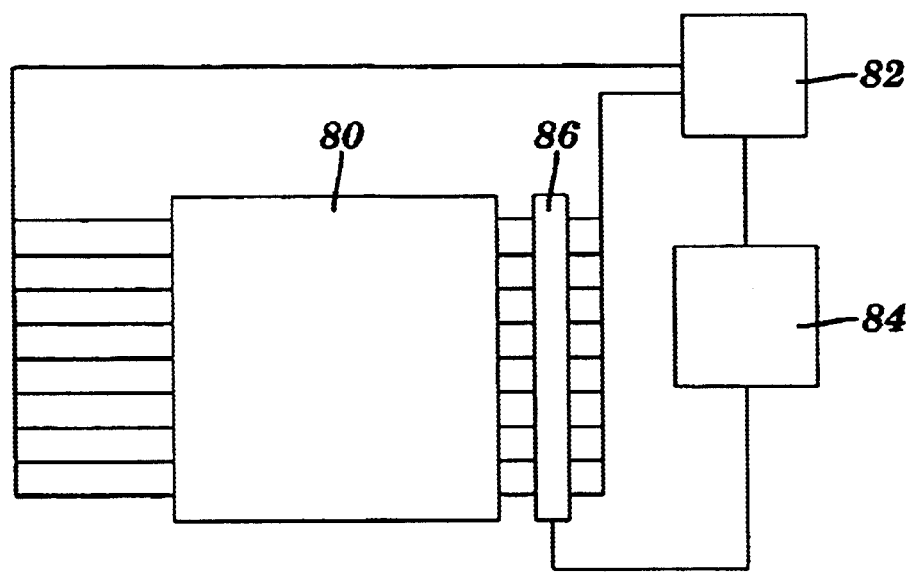
FIG. 8 shows an illustrative diagrammatic view of a variable Fourier diaphragm for use in a system of the invention.

The Fourier diaphragm may be formed of a variety of devices, including liquid crystal modulators and selective polarization devices. For example, as shown in FIG. 8, a Fourier diaphragm of the invention may include a liquid crystal modulator 80, a power source 82, a controller 84 and a multiple switching device 86. The controller causes power to be applied to the liquid crystal and communicates with the switching device 86 to select the region (or row as shown) of the liquid crystal to which the power will be applied. The liquid crystal will then pass illumination through the activated region while blocking illumination outside of the region.

Figure 9:
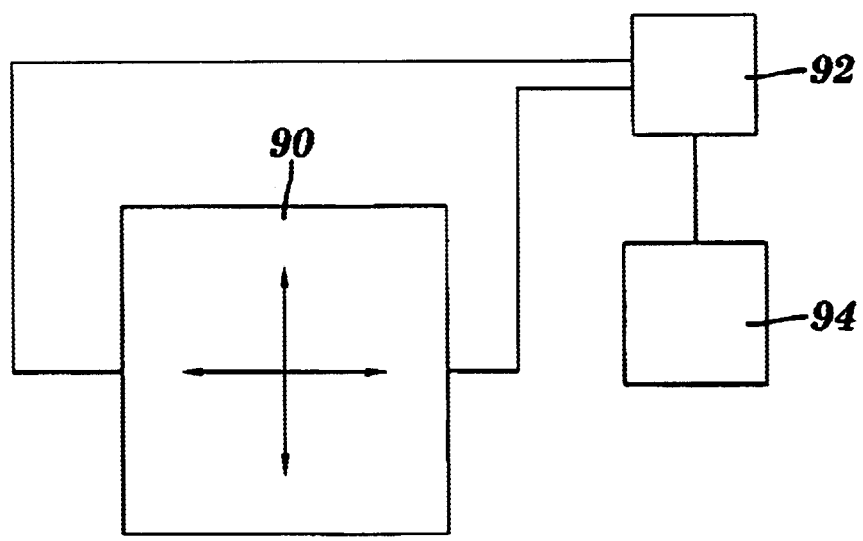
FIG. 9 shows an illustrative diagrammatic view of another variable Fourier diaphragm for use in a system of the invention.

As shown in FIG. 9, another type of Fourier diaphragm for use in a system of the invention may include a selective polarization device 90 that is coupled to a power source 92, which in turn is coupled to a controller 94. For systems that employ this type of Fourier diaphragm, the illumination from the multi-frequency illumination source should also be polarized differently for each of the plurality of signals having different frequencies. The Fourier diaphragm may then be electrically established at the desired polarization orientation to pass the desired signal while blocking the un-desired signals having other frequencies and other polarizations.

Those skilled in the art will appreciate that numerous modifications and variations may be made to the above disclosed embodiments without departing from the spirit and scope of the present invention.

What is claimed is:

1. An imaging system comprising:
   an illumination source for producing a first illumination field having a first frequency and a second illumination field having a second frequency;
   a modulator for receiving said first illumination field and said second illumination field, and for producing a first modulated illumination field and a second modulated illumination field; and
   a variable Fourier diaphragm for selectively passing one of said first modulated illumination field and said second modulated illumination field.

2. The imaging system as claimed in claim 1, wherein said illumination source produces a third illumination field having a third frequency, said modulator further receives said third illumination field and produces a third modulated illumination field, and said variable Fourier diaphragm selectively passes one of said first modulated illumination field, said second modulated illumination field, and said third modulated illumination field.

3. The imaging system as claimed in claim 1, wherein said modulator includes a grating light valve.

4. The imaging system as claimed in claim 3, wherein the grating light valve includes ribbons and the period of spacing between ribbons may be changed by grouping together sets of two or more ribbons.

5. The imaging system as claimed in claim 4, wherein said variable Fourier diaphragm is adjusted responsive to changes in the spacing of the ribbons of said modulator.

6. The imaging system as claimed in claim 1, wherein said variable Fourier diaphragm is linearly adjustable.

7. The imaging system as claimed in claim 1, wherein said variable Fourier diaphragm includes a selectively actuatable liquid crystal device.

8. The imaging system as claimed in claim 1, wherein said variable Fourier diaphragm includes a selective polarization device.

9. The imaging system as claimed in claim 1, wherein said illumination source provides time division multiplexed illumination of said first illumination field and said second illumination field.

10. An imaging system comprising:

an illumination source for producing a first illumination field having a first frequency and a second illumination field having a second frequency;

a grating light valve for receiving said first illumination field and said second illumination field, and for producing a first modulated illumination field and a second modulated illumination field, said grating light valve including ribbons selectively having a first spacing period or a second spacing period; and a variable Fourier diaphragm for selectively passing one of said first modulated illumination field and said second modulated illumination field to an imaging surface.

11. The imaging system as claimed in claim 10, wherein said illumination source produces a third illumination field having a third frequency, said grating light valve further receives said third illumination field and produces a third modulated illumination field, and said variable Fourier diaphragm selectively passes one of said first modulated illumination field, said second modulated illumination field, and said third modulated illumination field.

12. The imaging system as claimed in claim 10, wherein said variable Fourier diaphragm is adjusted responsive to changes in the spacing of the ribbons of said modulator.

13. The imaging system as claimed in claim 10, wherein said variable Fourier diaphragm is linearly adjustable.

14. The imaging system as claimed in claim 10, wherein said variable Fourier diaphragm includes a selectively actuatable liquid crystal device.

15. The imaging system as claimed in claim 10, wherein said variable Fourier diaphragm includes a selective polarization device.

16. The imaging system as claimed in claim 10, wherein said illumination source provides time division multiplexed illumination of said first illumination field and said second illumination field.

17. A method of providing illumination at selective frequencies in an imaging system, said method comprising the steps of:

providing illumination including a first illumination field having a first frequency and a second illumination field having a second frequency;

receiving said first illumination field and said second illumination field at a modulator;

producing a first modulated illumination field and a second modulated illumination field; and adjusting a variable Fourier diaphragm for selectively passing one of said first modulated illumination field and said second modulated illumination field to an imaging surface.

18. The method as claimed in claim 17, wherein said modulator includes a grating light valve.

* * * * *